United States Patent [19]

Chung

[11] Patent Number: 5,206,856
[45] Date of Patent: Apr. 27, 1993

[54] ROUTING OF NETWORK TRAFFIC

[75] Inventor: Fan R. K. Chung, Watchung, N.J.

[73] Assignee: Bell Communications Research, Inc., Livingston, N.J.

[21] Appl. No.: 616,396

[22] Filed: Nov. 21, 1990

Related U.S. Application Data

[63] Continuation-in-part of Ser. No. 457,285, Dec. 27, 1989, abandoned.

[51] Int. Cl.$^5$ .................... H04L 12/56; H04G 11/04
[52] U.S. Cl. ........................... 370/60; 370/94.1
[58] Field of Search .............. 370/60, 60.1, 94.1, 370/94.2, 94.3, 85.12, 85.15, 54, 16, 16.1; 340/827, 825.5, 825.51; 379/220, 221, 272, 273, 213

[56] References Cited

U.S. PATENT DOCUMENTS

| | | | |
|---|---|---|---|
| 4,669,113 | 5/1987 | Ash et al. | 379/221 |
| 4,704,724 | 11/1987 | Krishnan et al. | 379/221 |
| 4,740,954 | 4/1988 | Cotton et al. | 370/60 |
| 4,788,721 | 11/1988 | Krishnan et al. | 379/221 |
| 4,862,496 | 8/1989 | Kelly et al. | 379/221 |

Primary Examiner—Wellington Chin
Attorney, Agent, or Firm—Leonard Charles Suchyta; John T. Peoples

[57] ABSTRACT

A method is disclosed for configuring a network, composed of a plurality of nodes, to satisfy grade-of-service constraints such as traffic load and cost and, upon configuration, routing of service requests through admissible routes in the network in correspondence to the configuration topology. Both the configuration and routing are mutually dependent upon the selection of a set of integers which provide distinct sums over the integers in the set. The integers determine link interconnections between the nodes and the distinct sums are indicative of the admissible routes.

11 Claims, 8 Drawing Sheets

ROUTING OF NETWORK TRAFFIC

CROSS-REFERENCE TO A RELATED APPLICATION

This is a continuation-in-part of application Ser. No. 07/457,285 filed Dec. 27, 1989, now abandoned.

TECHNICAL FIELD OF THE INVENTION

This invention relates generally to the initial configuring of a complex nodal-type network and then the routing of traffic through the network and, more particularly, to a methodology for optimally selecting links interconnecting nodes of the network and routing traffic over these links in a manner commensurate with the selection technique.

BACKGROUND OF THE INVENTION

A basic function required of a conventional circuit-switched communication network is one of routing a service request through the network and then establishing a connection between an originating point and a destination point according to the route selected. In the terminology of telephony, this activity is often described as a calling party placing a call to a called party. The call is established on a path through the network designated a route. In turn, a route may be comprised of one or more intermediate points or nodes interconnected to other nodes by one or more links or trunk groups comprising servers or trunks. Finally, each server or trunk is basically a single transmission path such as a cable pair. Thus, a circuit-switched connection is characterized by the selection of a route through the network that is fixed for the duration of a call, i.e., the particular servers are dedicated to the call for its duration. Examples of such networks are the conventional analog intra-LATA (Local Access and Transport Area) telephone network and the analog inter-LATA (that is, long distance) telephone network.

Historically, traffic routing techniques were devised for so-called time-invariant, hierarchical, circuit-switched networks. In a hierarchical plan, nodes are assigned to a geographical area designated a "region" and each node is given a "rank." Under the plan, any node homes on another node of higher rank within the same region, but not on a node of lower rank. Such a plan effectively dictates the link connections between specific node-pairs; it followed, quite naturally, that traffic routing techniques were developed within the constraint of the hierarchical arrangement of nodes and very little flexibility was offered for devising other routing plans that may have emerged if node interconnection constraints had not been imposed. In fact, even in the hierarchical plan, it occasionally happens that the traffic, e.g., the call, is blocked either involuntarily or voluntarily. An involuntary blocking occurs when no route through the network can be found which has at least one free trunk in all the trunk groups. A voluntary blocking occurs when, even though an available route can be found, the call is blocked to protect future call attempts. A voluntary blocking may be indicated when the only available routes all go over two or more trunk group, with a sizable risk that carrying one more call now will lead to multiple call blockings.

With the advent of digital switches and data transmission techniques over cable and fiber media, packet-switched networks have been recently introduced. These networks are characterized by a time-sharing of servers comprising the links interconnecting network nodes. Initially, each message, e.g., a portion or sample of an analog telephone conversation, is digitized into an appropriate digital format. Then each digital message to be transmitted from a source node to a destination node is "packetized", that is, the digitized message is augmented with header information such as the source and destination addresses as well as trailer information for discerning the end of the packet. Each packet is transmitted on a given link in a time interval or slot selected from many slots generally available for transmission between node-pairs. Because of the detailed information embedded in the packet, the packet is self-routing in the sense that each node in the network can parse the contents of each packet in order to determine the processing required of a node-either forwarding the packet if the node is not the destination node, or detecting the packet message if the node is the desired destination node. Due to the discretization in packet transmission, timing information is important in a packet system so as to piece together segments of a conversation and restore intelligibility. However, this timing concern is more at the "local" or physical level and can be appropriately arranged once a network configuration and a "global" or logical routing strategy have been devised.

As alluded to above, newly installed packet systems no longer have imposed constraints like those of the hierarchical plan. Once a node pattern has been established or adopted, the interconnection of network nodes is unencombered in the sense that the conventional hierarchical rules do not apply. However, even in packet systems, after a configuration has been devised, techniques for efficiently routing packet traffic through the system still must be addressed.

SUMMARY OF THE INVENTION

The limitations and shortcomings of these and other techniques are obviated, in accordance with the present invention, by a methodology which considers the configuration of the network together with the routing of network traffic as mutually dependent and closely coupled, and wherein both the configuration and the routing strategy are expressible in a common mathematical framework. Network grade-of-service considerations such as load and cost guide the choice of network topology. When the network topology and routing strategy are couched in terms of the mathematical framework, the specification of transmission links between network nodes corresponds to a first predetermined set of integers having unique properties, whereas the admissible set of routes for network traffic to traverse the network corresponds to a second set of integers determined with reference to the first set of integers. This framework engenders a simplified routing algorithm which may be stored locally by each node for processing of the incoming messages.

The organization and operation of this invention will be better understood from a consideration of the detailed description of the illustrative methodologies, which follow, when taken in conjunction with the accompanying drawing.

DETAILED DESCRIPTION

Overview

Figure 1:
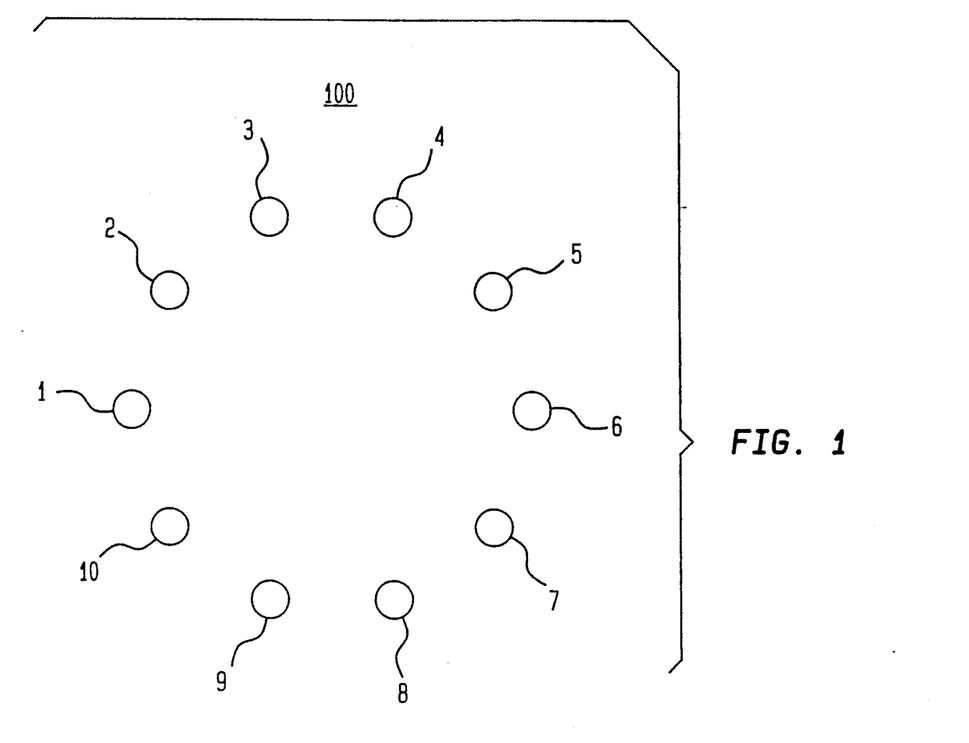
FIG. 1 is a pictorial diagram showing an unconnected n-node network representative of the type of network to be configured with links interconnecting various node-pairs.

In describing the illustrative embodiments, it is informative in conveying the principles of the present invention to consider, as a starting point, network 100 as depicted in FIG. 1. Network 100 is shown as a n-node network (n=10 for purposes of illustration) with the nodes arranged, pictorially, in circular or ring form; in practice, the nodes are geographically-dispersed and typically devoid of the symmetry shown. However, the nodes, if connected a seriatim, would form a ring in the figurative if not literal sense. Transmission links interconnecting the network nodes have not yet been shown since the configuration aspect of present invention relates to choosing and arranging the links for efficient routing of network traffic among the nodes. Although this network is less complex than those encountered in practice, the geometrical symmetry and small size of the network allows for brevity of description without loss of generality.

Figure 2:
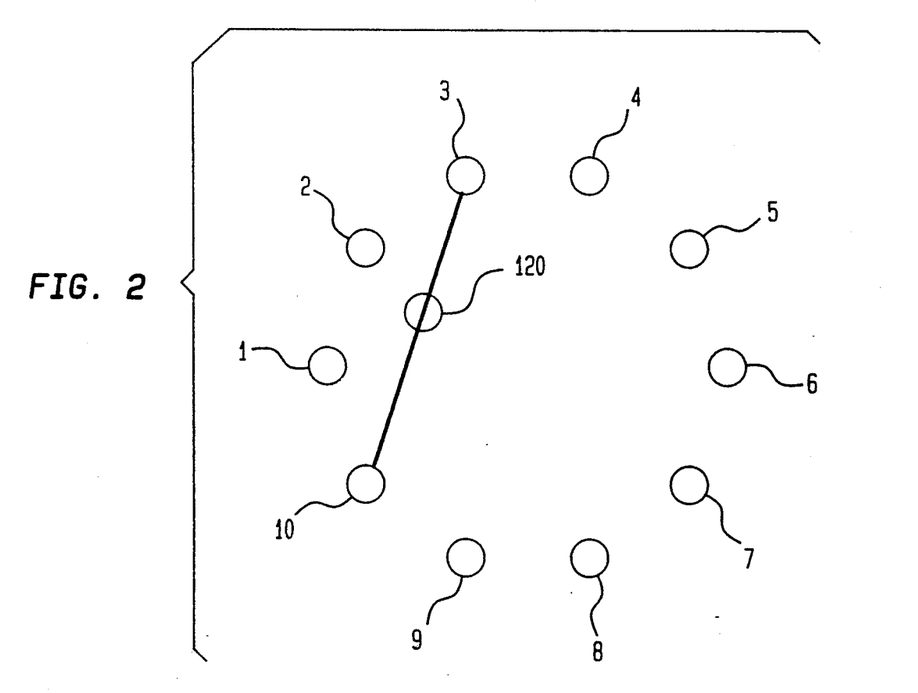
FIG. 2 is the node arrangement of FIG. 1 with an arbitrary link in place.

As the starting point, network 100 is composed of a set of n-nodes having references numerals 1 to 10, respectively. In configuring network 100 with links interconnecting nodes 1-10, the goal is to add links in a systematic manner so that a message can be routed efficiently from a given source or origination node to a desired destination or termination node. In FIG. 2, link 120 is shown as interconnecting nodes 3 and 10. In considering the strategy for placing links to route traffic and routing procedures, two different cases are pertinent.

1. Directed Case

Configuration

The first case, the so-called directed case, covers the situation wherein links transmit messages only in one direction. For this case, the configuring procedure is as follows: (i) a set X of k integers $\{x_1, x_2, \ldots, x_k\}$ is specified (the method for selecting the set X is discussed below); and (ii) network 100 is configured with a unidirectional link from node i to node j if the difference $(j-i) \pmod{n} = x$ for some x in X. (All computations throughout the detailed description are carried out mod n). Accordingly, the configuration of network 100 relies on the choice of set X. The number of integers in X is usually a given parameter depending on the traffic capacity and the cost of the network.

Figure 3:
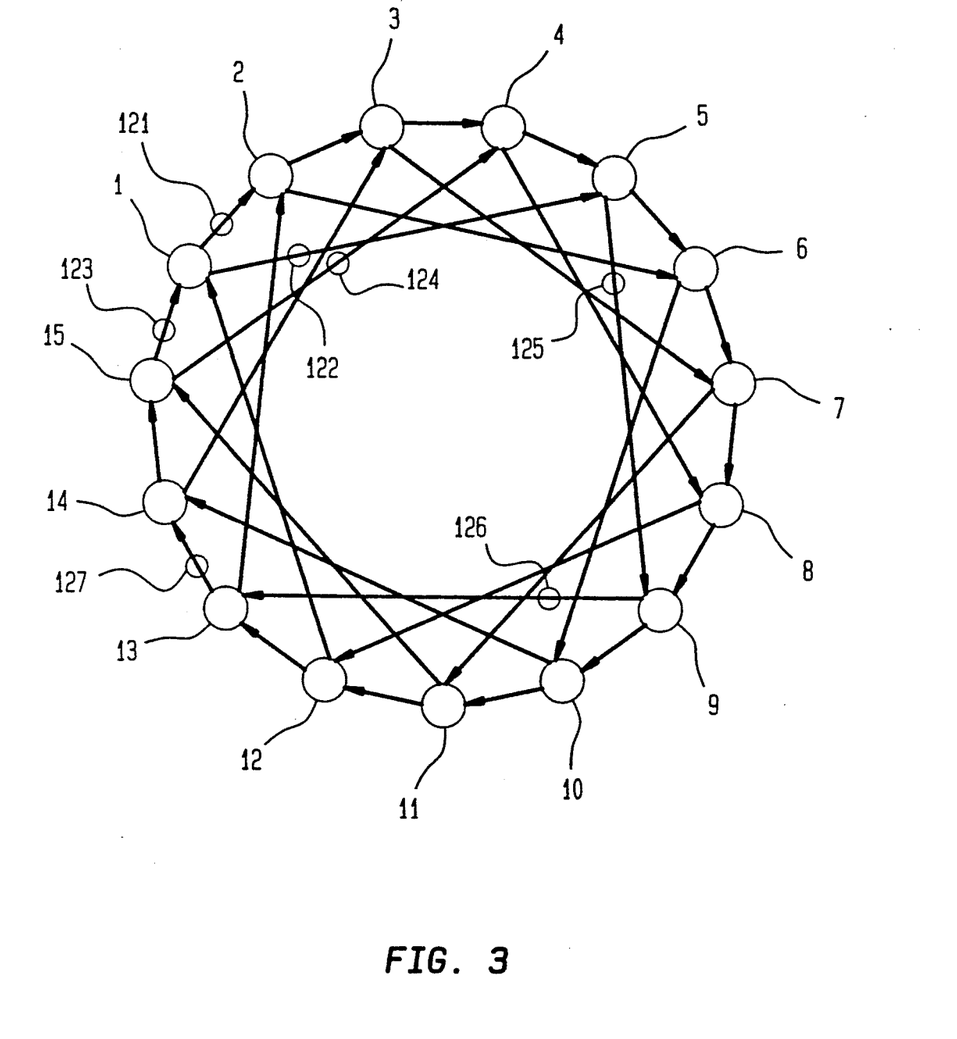
FIG. 3 is an example of a network having fifteen nodes configured with links for the directed network as derived in accordance with the present invention.

To visualize the application of the link selection technique before the theoretical basis is provided, a configuration example is now presented with n=15 and X={1,4}. The result of applying the configuration procedure above is depicted in FIG. 3. As shown, each node is linked to its neighboring up-stream node once-removed and to the up-stream node four-times removed in correspondence to the integers $x_1=1$ and $x_2=4$ in the set X. For example, node 1 is directly connected to node 2 via link 121 and to node 5 via link 122; similarly, node 15 is directly connected to nodes 1 and 4, via links 123 and 124, respectively.

To arrive at the network structure as shown in FIG. 3, X is selected to have k integers such that all the so-called partial sums $x_1 + \ldots + x_j$ for $j \leq \log_k n$ are distinct. Repetitions of each $x_k$ are allowed in forming the sums, especially whenever $k \leq \log_k n$. In the example, j=3 is the greatest integer satisfying $j \leq \log_2 15$, and the partial sums, namely, 1, 4, 1+1, 1+4, 4+4, 1+1+1, 1+1+4, 1+4+4, 4+4+4, are all different.

There are many ways to choose such X, either by heuristic methods, prior tabulations, or by algebraic methods. Some of such X can be found in: (1) R. C. Bose and S. Chowla, Theorems in additive theory of numbers, *Comment. Math. Helv.* 37 (1962), 141-147; (2) F. R. K. Chung, Diameters and eigenvalues, *J. of American Math. Soc.* 2 (1989), 187-196; and (3) Marshall Hall, Jr., Combinatorial Theory (1986), New York, John Wiley and Sons. A construction by algebraic techniques using finite fields is now described as being illustrative of the latter technique.

For $n = p^t - 1$ (where p is a prime, t is a positive number) and $|X| = p$, consider $GF(p^t)$ obtained by adjoining to $Z_p$, a set of integers mod p, a root w of an irreducible t-th degree polynomial F (x) in $Z_p[x]$. Now take an element g in $GF(p^t)$ that generates $GF^*(p^t)$ and consider the p elements $w, w+1, \ldots, w+p-1$. Now $w+i$ can be expressed as $g^{d_i}$ for some integers $d_i$, and these $d_i$, $0 \leq i \leq p-1$, will form the set X. The example of FIG. 3 is the case of p=2 and t=4. Generally, only those X sets having the integer 1 are chosen so that adjacent nodes are interconnected by links, that is, the network in its most basic form is a ring structure. In fact, the ring structure can be considered as the simplest or degenerative case of the general configuration algorithm.

Routing

It is supposed that the directed network under consideration is configured using the set X. In general, a message having node s as the source node is to be routed to node r as a destination node. Initially, the difference $(r-s) \pmod{n}$ is expressed as a sum using the largest partial sum which is $\leq (r-s) \pmod{n}$, and if necessary, this largest partial sum is augmented with other integers which are in X so that the cumulation of the partial sum plus the augmenting integers equals the difference $(r-s) \pmod{n}$; this cumulation sum is called the set-member sum. In general, $(r-s) \pmod{n} = x_1 + x_2 + \ldots + x_k + x_m + \ldots + x_n$ where $x_1, \ldots, x_k, x_m, x_n$ are in X. The message from s is sent to r along the route of the nodes $s, s+x_1, s+x_1+x_2, \ldots, s+x_1+\ldots+x_k+x_m \ldots +x_n = r$. Note that since $x_1+x_2+\ldots+x_k+x_m\ldots+x_n = x_2+x_1+\ldots+x_k+x_m+\ldots+x_n$ (the order does not matter), different routes can be used when necessary, say, due to link blocking. For example, if $s \to s+x_1$ is blocked, the alternative route $s \to s+x_2 \to s+x_1+x_2 \to \ldots$ can be selected. The set of all possible routes from node s to node r is called the set of admissible routes.

The results of the routing procedure for any configured network is summarized by a look-up table which provides the detailed routing information. The table shown below summarizes the routing information for the node configuration of FIG. 3 where $X=\{1,4\}$.

TABLE

| (j−i) (mod n) | PARTIAL SUM | SET-MEMBER SUM |
|---|---|---|
| 1 | 1 | 1 |
| 2 | 1+1 | 1+1 |
| 3 | 1+1+1 | 1+1+1 |
| 4 | 4 | 4 |
| 5 | 4+1 | 4+1 |
| 6 | 4+1+1 | 4+1+1 |
| 7 | 4+1+1 | 4+1+1+1 |
| 8 | 4+4 | 4+4 |
| 9 | 4+4+1 | 4+4+1 |
| 10 | 4+4+1 | 4+4+1+1 |
| 11 | 4+4+1 | 4+4+1+1+1 |
| 12 | 4+4+4 | 4+4+4 |
| 13 | 4+4+4 | 4+4+4+1 |
| 14 | 4+4+4 | 4+4+4+1+1 |

This table is resident in each node of a configured network. When a routing request for the transmission of a message from source node s to destination node r is received, the difference $(r-s)$ (mod n) is initially computed. This difference is then used as the entry point into the table and the routing information associated with the entry is used to route the message. As an example, it is supposed that node s=1 of FIG. 3 receives a message that is to be transmitted to node r=14. The difference $(r-s)$ (mod n) between the node numbers is 13. With reference to the $(r-s)$ (mod n) column of the table, there is a corresponding partial sum of 4+4+4 and an set-member sum of 4+4+4+1. If it is assumed that no links are blocked, then the preferred route for the message transmission is as follows: route the message from node 1 to node 5 along link 122; from node 5 to node 9 along link 125; from node 9 to node 13 along link 126; and finally from node 13 to node 14 along link 127. This routing corresponds to the sequence 4+4+4+1. An alternate route would include nodes 1, 2, 6, 10, and 14, in that order, and corresponds to the sequence 1+4+4+4+.

Implicit in the above packet routing discussion is the step of parsing the packet for its contents to determine destination information. For example, when the packet arrives at an intermediate node t, the difference $(r-t)$ (mod n) is formed in the intermediate node; information that the destination node is r is obtained by parsing the packet. Processing by the intermediate node again involves a table look-up and routing in a manner commensurate with the table information. For instance, with reference to the above example where s=1 and r=14, if the packet is first routed to node t=5 from node 1 along link 122, then node 5 computes the difference $(r-t)$ (mod 15)=(14−5)=9. A table look-up indicates that the route, in short-hand form, is 4+4+1. Accordingly, the message would be sent to node 9 from node 5 along link 125 as a first choice.

Figure 4:
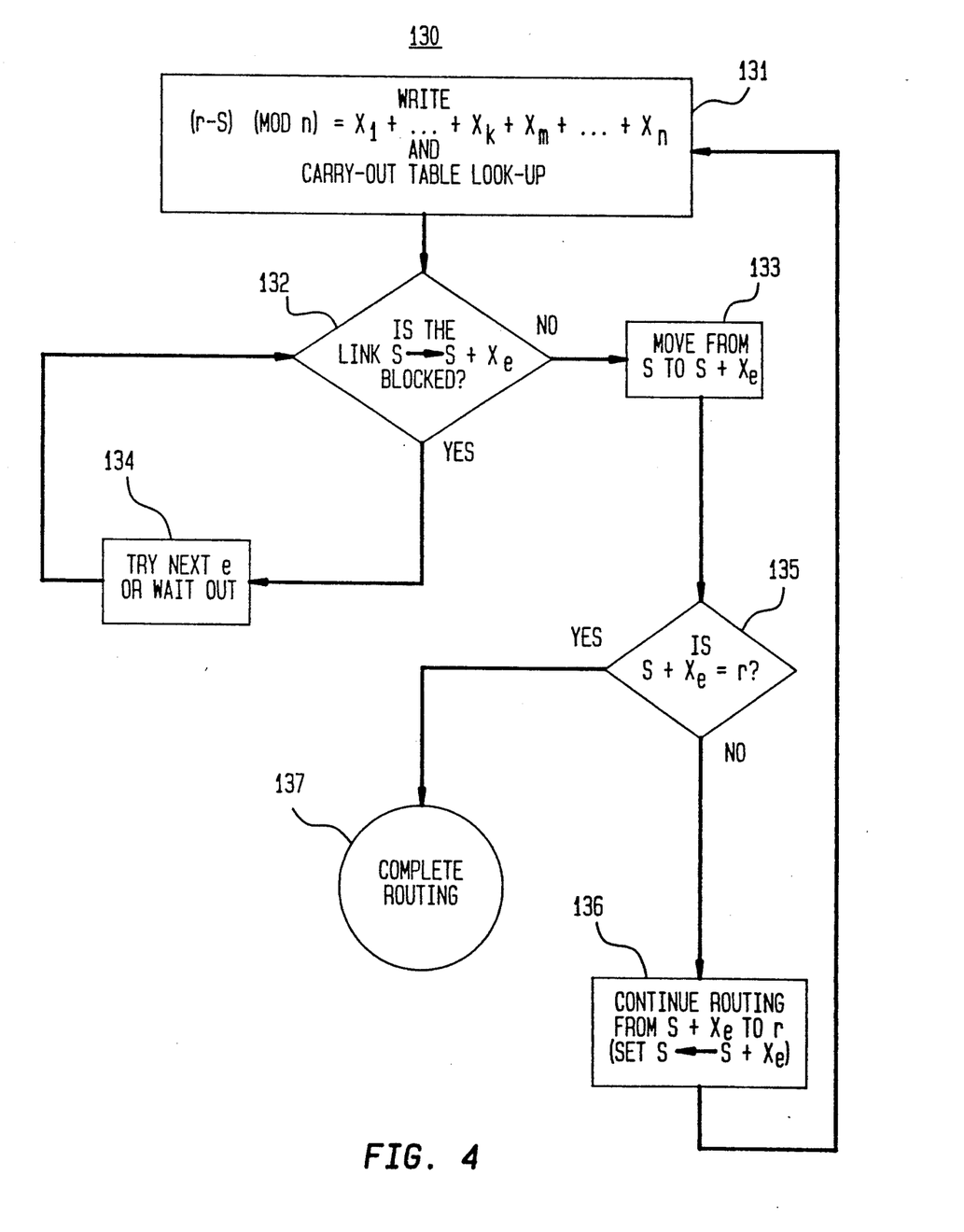
FIG. 4 is a flow diagram of the routing algorithm for routing traffic through a general directed network configured in accordance with the present invention.

The diagram 130 of FIG. 4 summarizes the routing algorithm in flow form for the directed case. As depicted by initial processing block 131, the difference $(r-s)$ (mod n) is expressed in terms of the set-member sums and the location of this difference in the TABLE is carried out. Once expressed in these terms, decision block 132 is invoked to determine if the link having the generic representation $s+x_e$ is busy. If this link is busy, then processing block 134 is entered to determine if an alternative link should be tried or if the packet should be stored until the busy link is free. On the other hand, if the link is not busy, then processing block 133 is invoked to pass the packet from the present node s to the next node $s+x_e$. Then, processing block 135 is entered to determine if the destination node has been reached; if so, the packet routing is complete, as indicated by termination block 137. Otherwise, the processing represented by block 136 is invoked to continue transmission of the packet from node $s+x_e$ to node r with reference to the table look-up results of initialization block 131.

Figure 5:
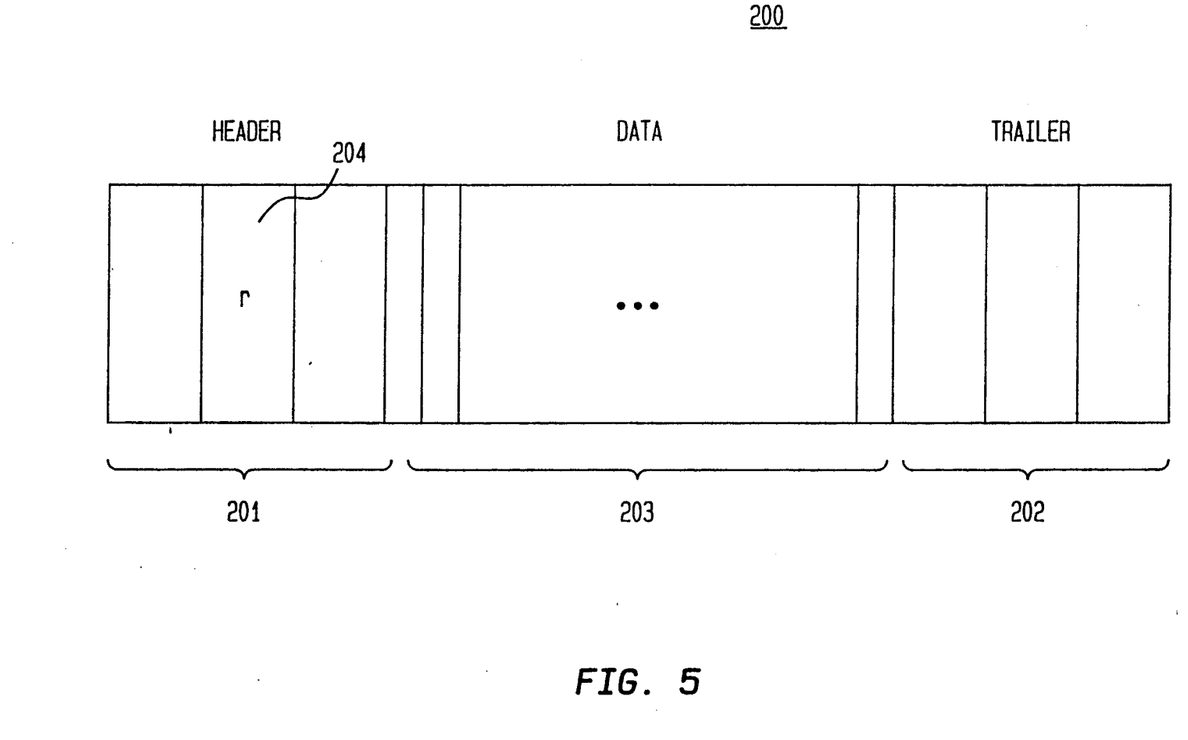
FIG. 5 illustrates an arrangement of data in an generalized data packet.
Figure 6:
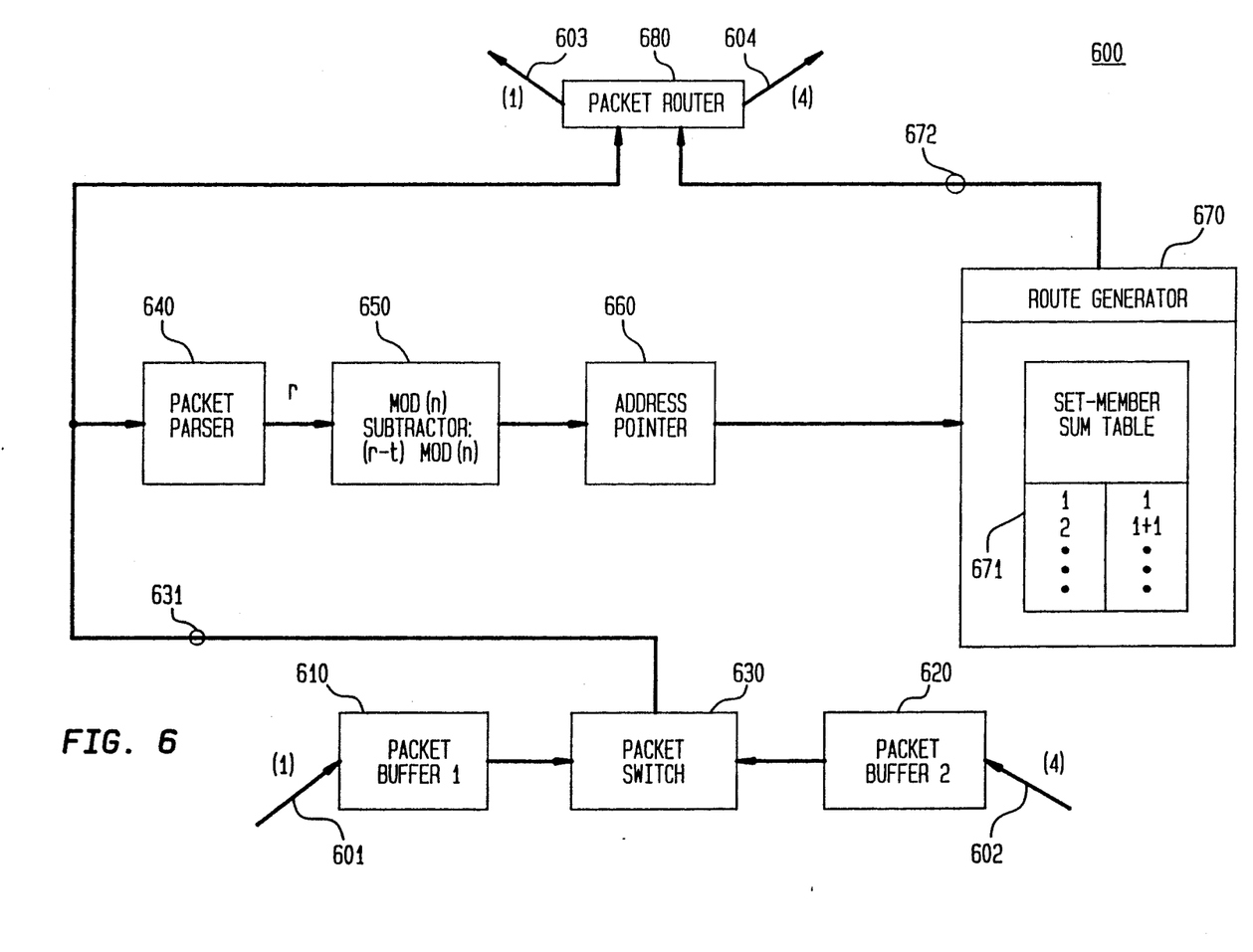
FIG. 6 is a block diagram of node circuitry for routing a packet in accordance with the directed case of the present invention.

With respect to circuitry for the routing packets through any one of the nodes in the nodal network, reference is made to FIGS. 5 and 6. Packet 200 of FIG. 5 illustrates an arrangement of data in a single data packet, which is usually composed of three main segments, namely, header 201, trailer 202, and data part 203. Typically each segment has a fixed bit length. Embedded in header 201 is the bit representation for destination node r, which is shown by sub-segment 204 in FIG. 5. Any node receiving a packet represented by packet 200 can process or parse packet 200 to obtain destination information.

Block diagram 600 of FIG. 6 is an illustrative embodiment of node packet routing circuitry for a general node, designated r above, for routing packet 200 in accordance with the directed case of the present invention. In FIG. 6, two packet buffers 610 and 620 receive and store packets on a first-in, first-out basis as they arrive serially on transmission links 601 and 602, respectively. Each transmission link 601 or 602 may be any conventional communication path designed to support packet transmission, such as, fiber optic cable, wire cable, or satellite links. Packet switch 630 monitors buffers 610 and 620 for the appearance of packets in the buffers and switches the next packet to be processed onto channel 631. In effect, packets in buffers 610 and 620 alternately deliver packets onto channel 631. If one of the buffers has no packet in its queue, then the other of the buffers may provide two or more contiguous packets. Channel 631 serves as an input to both packet parser 640 and packet router 680. Parser 640 processes the bit positions of sub-segment 204 to determine the destination node r. This node information is transferred to subtraction device 650 wherein the quantity $(r-t)$ mod(n) is determined. This quantity is processed by address pointer circuitry 660 to produce a pointer for accessing information in route generator 670. In particular, the pointer selects an associated set-member sum from table 671. The contents of table 671 are essentially the same as the contents of TABLE discussed above. Once the set-member sum has been determined, this information is forwarded to packet router 680 via lead 672 in order to route the packet which has arrived in parallel via channel 631. Router 680 delivers the packet to the appropriate link 603 or 604 depending upon the route information delivered over lead 672.

2. Undirected Case

Configuration

The second case, the so-called undirected case, covers the situation wherein links may transmit messages in both directions. For this case, the configuring procedure is as follows: (i) a set X of integers is specified (the general method for selecting the set X was discussed above for the directed case); and (ii) network 100 is configured with a bidirectional link from node i to node j if the sum (j+i) (mod n)=x for some x in X. As in the previous directed case, the configuration of network 100 relies on the choice of set X.

Figure 7:
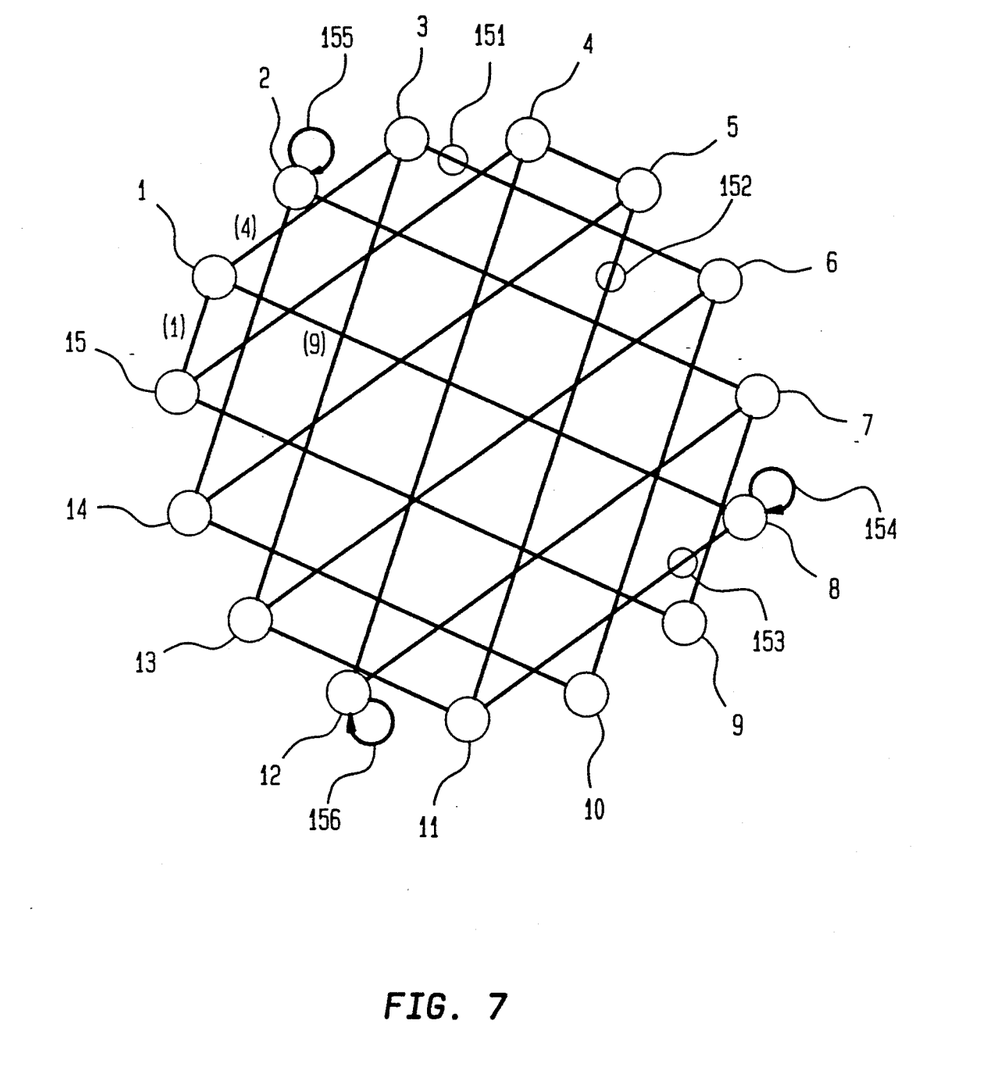
FIG. 7 is an example of a network having fifteen nodes configured with links for the undirected network as derived in accordance with the present invention.

To visualize the application of the link selection technique before a more theoretical discussion is presented, a configuration example is provided with n=15 and X={1,4,9}. The result of applying the configuration procedure is depicted in FIG. 7. Each link, such as exemplified by link 151 connecting node 3 with node 6, is bidirectional in transmission capability. Link 151 is identified with the set integer 9, whereas link 152 is identified with integer 1, and link 153 is identified with integer 4. Loop links, as exemplified by link 154 homing on node 8, are shown for consistency so that each node has three links homing on it. Loop link 154 corresponds to $x_1=1$, whereas loop link 155 corresponds to $x_2=4$, and loop link 156 corresponds to $x_3=9$.

Routing

To carry-out routing, a routing map is generated wherein (i+j) (mod n) is written as an alternating sum with an odd number of terms, i.e., (i+j) (mod n)=$x_1-x_2+x_3-x_4+ \ldots +x_0$, and (i−j) (mod n) is written as an alternating sum with an even number of terms. The odd and even alternating sums are referred to generically as set sums (as distinguished from the directed case where certain sums were specifically referred to as set-member sums). The routing map for the network nodes of FIG. 7 is shown below:

| NODE | MAP SET SUMMATION | SET DIFFERENCE |
|---|---|---|
| 1 | 1 | 9−1+9−1 |
| 2 | 9−1+9 | 9−4+1−4 |
| 3 | 1−9+4−9+1 | 4−1 |
| 4 | 4 | 1−9+1−4 |
| 5 | 1−9+1−4+1 | 9−4 |
| 6 | 9−4+1 | 4−1+4−1 |
| 7 | 4−1+4 | 1−9 |
| 8 | 1−9+1 | 9−1 |
| 9 | 9 | 1−4+1−4 |
| 10 | 1−4+1−4+1 | 4−9 |
| 11 | 4−9+1 | 9−1+4−1 |
| 12 | 9−1+4 | 1−4 |
| 13 | 1−4+1 | 4−9+4−1 |
| 14 | 4−9+4 | 1−9+1−9 |
| 15 | 1−9+1−9+1 | — |

The routing scheme is then based on the following two steps, presuming a source node s and a destination node r:

(a) the routing map is checked for both (s+r) (mod n) and (s−r) (mod n) and the one with the least number of terms is selected. For example, for s=5 and r=8, the following obtains:

(5+8) (mod 15)=13=1−4+1 and
(5−8) (mod 15)=12=1−4;

therefore, the latter route is chosen.

(b) once the admissible route is selected, as expressed by $x_1-x_2+x_3-x_4 \ldots$, then the packet is sent from s to r along the route $s_1 \leftarrow x_1-s$, and then according to $s_2 \leftarrow x_2-s_1$, . . . , and finally according to $r \leftarrow x_{r-1}-s_{r-1}$, where all computations are carried out modulo n. For instance, in the example of step (a), the links associated with $x_1=1$ and $x_2=4$ are traversed sequentially as follows:

$s_1 \leftarrow (1-5)$ (mod 15)=11, and
$r=s_2 \leftarrow (4-11)$ (mod 15)=8.

Thus, the packet moves from node 5 to node 11 along link 152 and from node 11 to node 8 along link 153.

Figure 8:
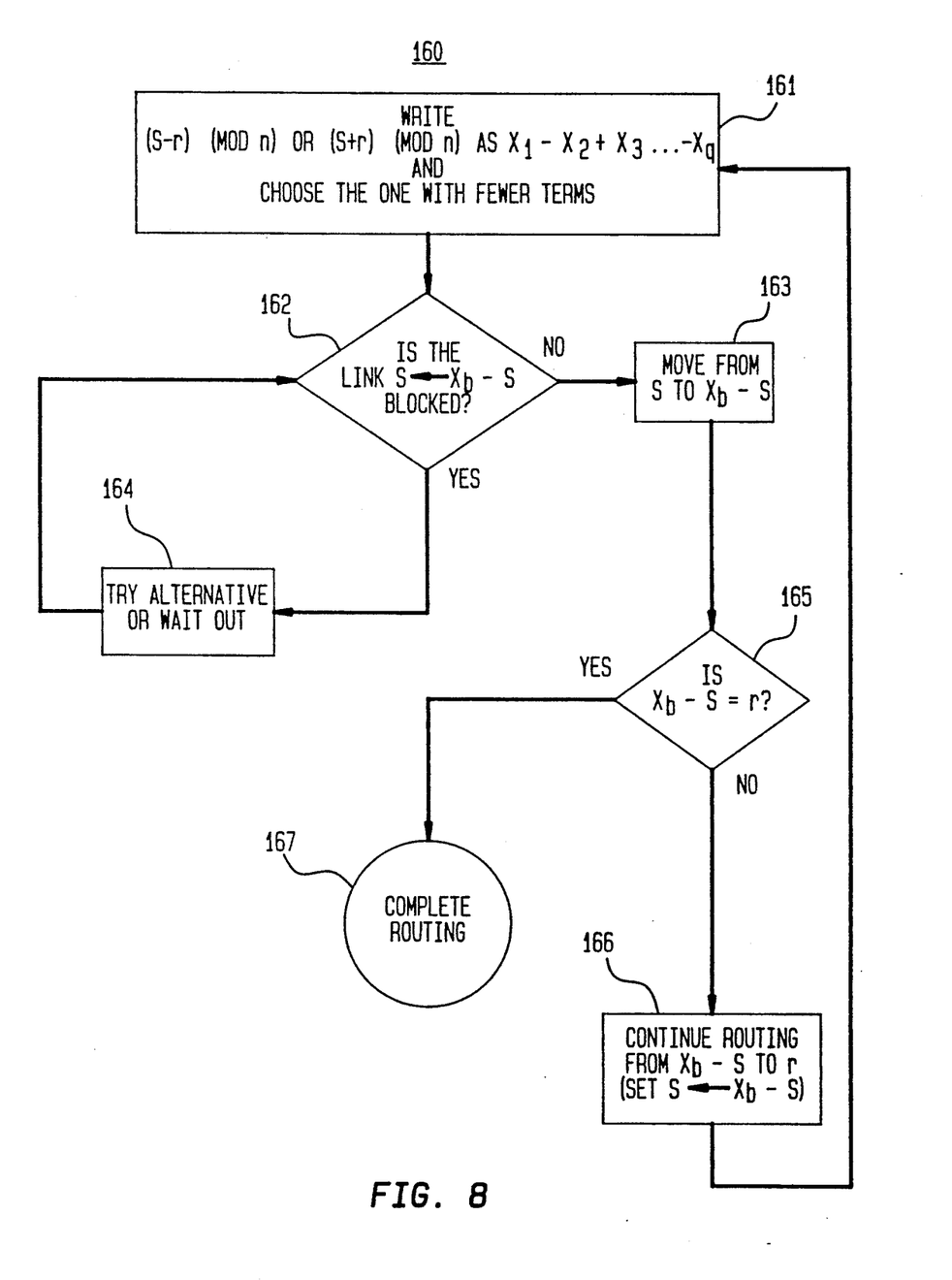
FIG. 8 is a flow diagram of the routing algorithm for routing traffic through a general undirected network configured in accordance with the present invention.

The diagram 160 of FIG. 8 summarizes the routing algorithm in flow form for the undirected case. As depicted by intial processing block 161, the difference (s−r) (mod n) or the summation (s+r) (mod n) is expressed in terms of the set sums and the locations of this difference and this summation in the M A P are carried out; the M A P entry with fewer terms is selected as the desired route. Once expressed in these terms, decision block 162 is invoked to determine if the link having the generic representation $s \leftarrow x_b - s$ is busy. If this link is busy, then processing block 164 is entered to determine if an alternative link should be tried or if the packet should be stored until the busy link is free. On the other hand, if the link is not busy, then processing block 163 is invoked to pass the packet from the present node s to the next node $x_b-s$. Then, processing block 165 is entered to determine if the destination node has been reached; if so, the packet routing is complete, as indicated by termination block 167. Otherwise, the processing represented by block 166 is invoked to continue transmission of the packet from the present node (referred generically as $x_b-s$), by referring to the M A P look-up results generated by initialization block 161.

Although the above description has been couched in terms of packet routing, it is possible, particularly for new circuit-switched networks, to configure the circuit-switched network and route a call using links derived in the same manner as the configuration and routing methodology of the packet-switched arrangement. For instance, in the directed case, a call path along the $(x_1+x_2+\ldots)$ truck groups corresponding to $x_1, x_2,$ and so forth can be established as an admissible path and the call may be connected accordingly.

Figure 9:
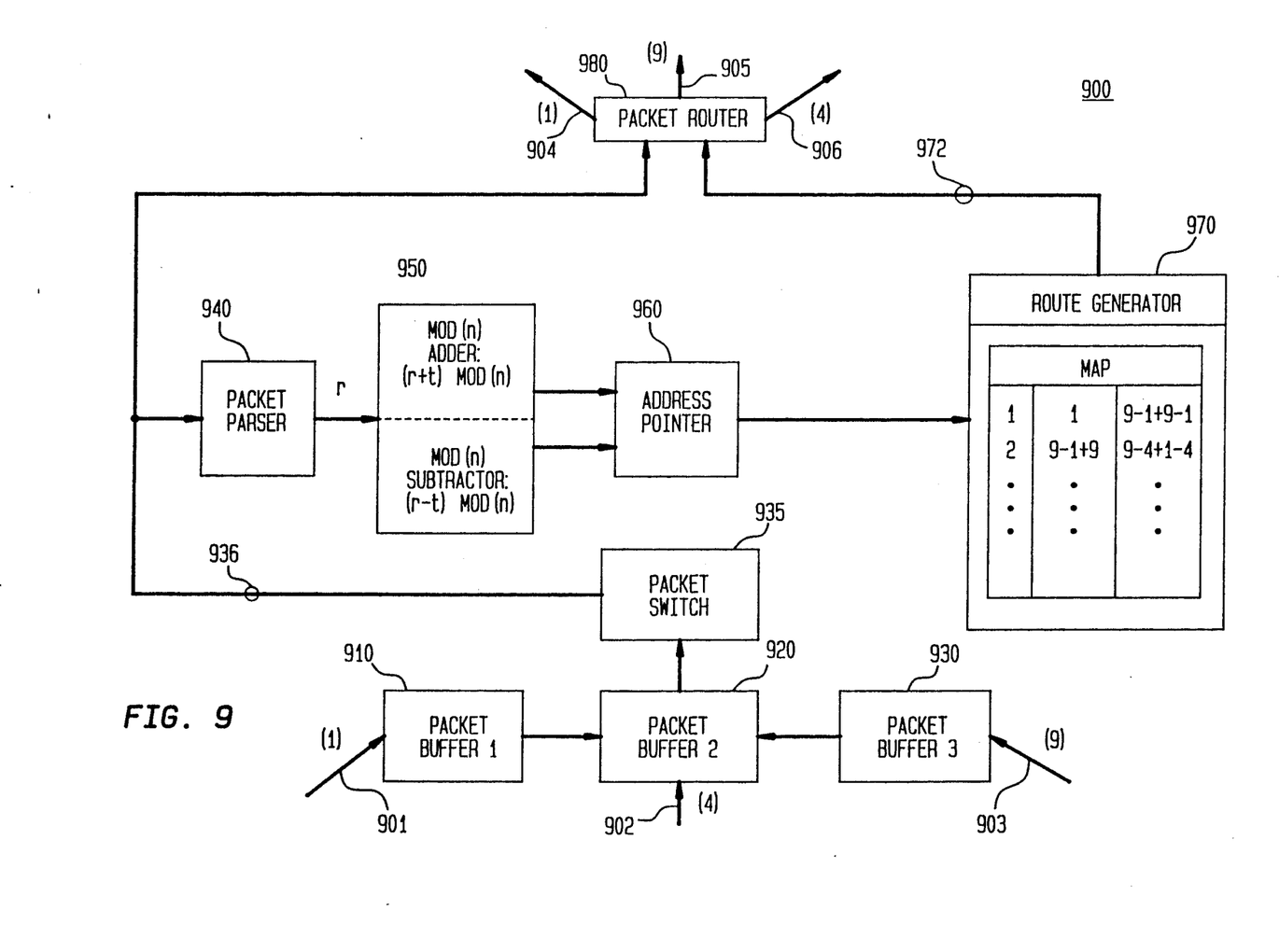
FIG. 9 is a block diagram of node circuitry for routing a packet in accordance with the undirected case of the present invention.

With respect to circuitry for the routing packets through any one of the nodes in the undirected nodal network, reference is made to FIG. 9. Block diagram 900 of FIG. 9 is an illustrative embodiment of packet routing node circuitry for a general node t. In FIG. 9 three packet buffers 910, 920, and 930 receive and store packets on a first-in, first-out basis as they arrive serially on transmission links 901, 902, and 903, respectively. Each transmission link 901, 902, or 903, as before, may be any conventional communication path designed to support packet transmission, such as fiber optic cable, wire cable, or satellite links. Packet switch 935 monitors buffers 910, 920, and 930 for the appearance of packets in the buffers and switches the next packet to be processed onto channel 936. In effect, packets in buffers 910, 920, and 930 alternately deliver packets onto channel 936. If one of the buffers has no packet in its queue, then others of the buffers may provide two or more contiguous packets. Channel 936 serves as an input to both packet parser 940 and packet router 980. Parser 940 processes the bit positions of sub-segment 204 to determine the destination node r. This node information is transferred to device 650, which is a combined subtraction and addition device and wherein the quantities (r−t) mod(n) and (r+t) mod(n) are determined. These quantities are processed by address pointer circuitry 960 to produce a pointer for accessing information in route generator 970. In particular, the pointer selects an associated alternating sum from table 971. The contents of table 971 are essentially the same as the contents of M A P discussed above. Once the appropriate alternating sum has been determined, this information is forwarded to packet router 980 via lead 972 in order to route the packet which has arrived in parallel via channel 936. Router 980 delivers the packet to the appropriate link 904, 905, or 905 depending upon the route information delivered over lead 972.

Although both the directed and undirected case have been discussed in terms of configuring a network to implement a routing strategy based on a set X, it is clear to one of skill in the art that the set X can be selected dynamically, based upon such factors as the time of day can the network load, and a network can be dynamically configured accordingly. Configuration on a dynamic basis is viable in networks wherein the communication paths are not fixed, but can be allocated as the need arises. Such might be the case in satellite communications. The dynamic configuration would be carried out by changing the contents of the tables in either route generators 670 and 970 for the the directed and undirected cases, respectively.

It is to be understood that the routing methodologies illustrated herein are not limited to specific forms disclosed by way of example and illustration, but may assume other embodiments and methods limited only by the scope of the appended claims.

What is claimed is:

1. A method for physically implementing a directed network composed of a plurality n of nodes, with i and j representing an arbitrary pair of the nodes, the method comprising the steps of selecting a set X of k integers as determined by network grade-of-service constraints, wherein said set X is selected to produce distinct partial sums corresponding to all $(j-i)$ (mod n) differences, $i \neq j$, and interconnecting the network nodes with unidirectional links from node i to node j if and only if $(j-i)$ (mod n)=x for some x in X as determined by said partial sums.

2. A method for transmitting a packet over a directed network composed of a plurality n of nodes, the packet originating in node s and destined for node r, the method comprising the steps of interconnecting network nodes with links according to the relationship: for each node pair i and j, $i \neq j$, configuring the network with a unidirectional link from said $i^{th}$ to said $j^{th}$ node if and only if $(j-i)$ (mod n)=x for some x in X, where X is a predefined set of k integers $\{x_1, x_2, \ldots x_k\}$ having distinct partial sums as determined by network grade-of-service considerations, selecting admissible routes from s to r, $s \neq r$, in correspondence to set-member sums $x_1 + x_2 + \ldots + x_k + x_m + \ldots + x_n$ equaling $(r-s)$ (mod n), and transmitting the packet from node s to node r along a selected one of said admissible routes in correspondence to the $(r-s)$ (mod n) difference.

3. The method as recited in claim 2 wherein said admissible routes are identified by referring to a look-up table stored in each of the nodes receiving the packet for processing.

4. The method as recited in claim 3 wherein the destination node r is embedded as packet information, the packet traverses an intermediate node t as the packet is transmitted from node s to node r and the method further comprises the steps of parsing the packet as it arrives at the intermediate node t as the packet traverses said selected one of said routes, in the intermediate node t, determining an intermediate difference $(r-t)$ (mod n) and entering said look-up table assigned to the intermediate node with said intermediate difference to determine an intermediate route from the set of admissible routes associated with the intermediate node t, and forwarding the packet along said intermediate route in correspondence to said intermediate difference.

5. The method as recited in claim 2 wherein each of said admissible routes contains at least the largest set-member sum which is $\leq (j-i)$ (mod n) for all $i \neq j$.

6. The method as recited in claim 2 wherein said selected one of said routes, being associated with one of said set-member sums, is composed of selected links corresponding to distinct set integers in said associated set-member sum, and wherein said selected links may be traversed in any order corresponding to a permutation of said distinct set integers.

7. A method for physically implementing an undirected network composed of a plurality n of nodes, with i and j representing an arbitrary pair of the nodes, the method comprising the steps of selecting a set X of k integers as determined by network grade-of-service constraints, wherein said set X is selected to produce distinct alternating partial sums having an even number of set integers corresponding to all $(i-j)$ (mod n) differences, $i \neq j$, and distinct partial sums having an odd number of set integers corresponding to all $(i+j)$ (mod n) summations, $i \neq j$, and interconnecting the network nodes with bidirectional links from node i to node j if and only if $(j+i)$ (mod n)=x for some x in X as determined by said alternating partial sums and said distinct partial sums.

8. A method for transmitting a packet over an undirected network composed of a plurality n of nodes, the packet originating in node s and destined for node r, the method comprising the steps of interconnecting network nodes with links according to the relationship: for each node pair i and j, $i \neq j$, configuring the network with a bidirectional link from said $i^{th}$ to said $j^{th}$ node if and only if $(i+j)$ (mod n)=x for some x in X, where X is a predefined set of k integers $\{x_1, x_2, \ldots x_k\}$ having distinct partial summations with an odd number of terms and distinct partial differences with an even number of terms as determined by network grade-of-service considerations, selecting admissible routes from s to r, $s \neq r$, in correspondence to even set sums $x_1 - x_2 + x_3 - x_4 + \ldots + x_e$ equaling $(s-r)$ (mod n), or odd set sums $x_1 - x_2 + x_3 - x_4 + \ldots - x_o$ equaling $(s+r)$ (mod n), and transmitting the packet from node s to node r along a selected one of said admissible routes in correspondence to the fewest number of links in either the $(s-r)$ (mod n) difference or the $(s+r)$ (mod n) summation.

9. The method as recited in claim 8 wherein said admissible routes are identified by referring to a look-up map stored in each of the nodes receiving the packet for processing.

10. The method as recited in claim 9 wherein the destination node r is embedded as packet information the packet traverses an intermediate node t as the packet is transmitted from node s to node r and the method further comprises the steps of parsing the packet as it arrives at the intermediate node t as the packet traverses said selected one of said routes, in the intermediate node t, determining an intermediate difference (t−r) (mod n) and an intermediate summation (t+r) (mod n) and entering said look-up map assigned to the intermediate node t with said intermediate difference and said intermediate summation to determine an intermediate route from the set of admissible routes associated with the intermediate node t and forwarding the packet along said intermediate route.

11. The method as recited in claim 8 wherein said selected one of said routes, being associated with one of said set sums, is composed of selected links corresponding to distinct set integers in said associated set sum, and wherein said selected links may be traversed in any order corresponding to a permutation of said distinct set integers.

* * * * *